(12) United States Patent
MacNeille et al.

(10) Patent No.: US 9,870,703 B2
(45) Date of Patent: Jan. 16, 2018

(54) PEDESTRIAN WARNING SYSTEM PROVIDING ADJUSTABLE ACOUSTIC INDICATIONS

(71) Applicant: Ford Global Technologies, LLC, Dearborn, MI (US)

(72) Inventors: Perry Robinson MacNeille, Lathrup Village, MI (US); Bo Wu, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/181,831

(22) Filed: Jun. 14, 2016

(65) Prior Publication Data

US 2017/0358203 A1    Dec. 14, 2017

(51) Int. Cl.
G08B 21/00    (2006.01)
G08G 1/005    (2006.01)

(52) U.S. Cl.
CPC .................... *G08G 1/005* (2013.01)

(58) Field of Classification Search
CPC ...................................... G08B 1/005
USPC ................ 340/425.5, 463, 464, 905, 944
See application file for complete search history.

(56) References Cited

U.S. PATENT DOCUMENTS

| | | | |
|---|---|---|---|
| 7,812,740 B2 | 10/2010 | Mergen | |
| 8,253,589 B2 | 8/2012 | Grimm et al. | |
| 8,537,030 B2 | 9/2013 | Perkins | |
| 9,189,452 B2 | 11/2015 | Hahne | |
| 2011/0199199 A1* | 8/2011 | Perkins | B60Q 1/506 340/435 |
| 2013/0187792 A1 | 7/2013 | Egly | |
| 2014/0056438 A1 | 2/2014 | Baalu et al. | |
| 2015/0035685 A1 | 2/2015 | Strickland et al. | |
| 2015/0158426 A1 | 6/2015 | Sonoda | |

* cited by examiner

*Primary Examiner* — Jeffery Hofsass
(74) *Attorney, Agent, or Firm* — James P. Muraff; Neal, Gerber & Eisenberg LLP

(57) ABSTRACT

Systems and methods are disclosed for a pedestrian warning system. An example disclosed method to simulate noise for an electric or noise-dampened vehicle to warning pedestrians includes producing a first sound at a first frequency range from a first sound generator located at a front of the vehicle. The method also includes producing a second sound at a second frequency range from a second sound generator located under the vehicle. Additionally, the example method includes adjusting the acoustic characteristics of the first and second sounds based on vehicle motion data.

11 Claims, 4 Drawing Sheets

PEDESTRIAN WARNING SYSTEM PROVIDING ADJUSTABLE ACOUSTIC INDICATIONS

TECHNICAL FIELD

The present disclosure generally relates to vehicle sound systems and, more specifically, a pedestrian warning system.

BACKGROUND

Electric motors in electric vehicles are very quiet compared to combustion engines in traditional fuel-based vehicles. Additionally, as exhaust systems of the traditional vehicles improve and idle stop-start systems become more widespread, these traditional vehicles are becoming quieter. Often, quiet vehicles are not recognized by pedestrians where vehicles and people are in close proximity.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

An example disclosed method to simulate noise for an electric or noise-dampened vehicle to warning pedestrians includes producing a first sound at a first frequency range from a first sound generator located at a front of the vehicle. The method also includes producing a second sound at a second frequency range from a second sound generator located under the vehicle. Additionally, the example method includes adjusting the acoustic characteristics of the first and second sounds based on vehicle motion data.

An example apparatus to simulate noise for a vehicle includes a first sound generator positioned at a front of the vehicle, a second sound generator positioned under the vehicle; and a sound controller. The example sound controller is to produce a first sound from the first sound generator and produce a second sound from the second sound generator. The example sound controller is also to adjust the acoustic characteristics of the first and second sounds based on vehicle motion data.

An tangible computer readable medium comprising instructions that, when executed, cause a vehicle to produce a first sound at a first frequency range from a first sound generator located at a front of the vehicle. The example instruction, when executed, also cause the vehicle to produce a second sound at a second frequency range from a second sound generator located under the vehicle. Additionally, the example instruction, when executed, cause the vehicle to adjust the acoustic characteristics of the first and second sounds based on vehicle motion data.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
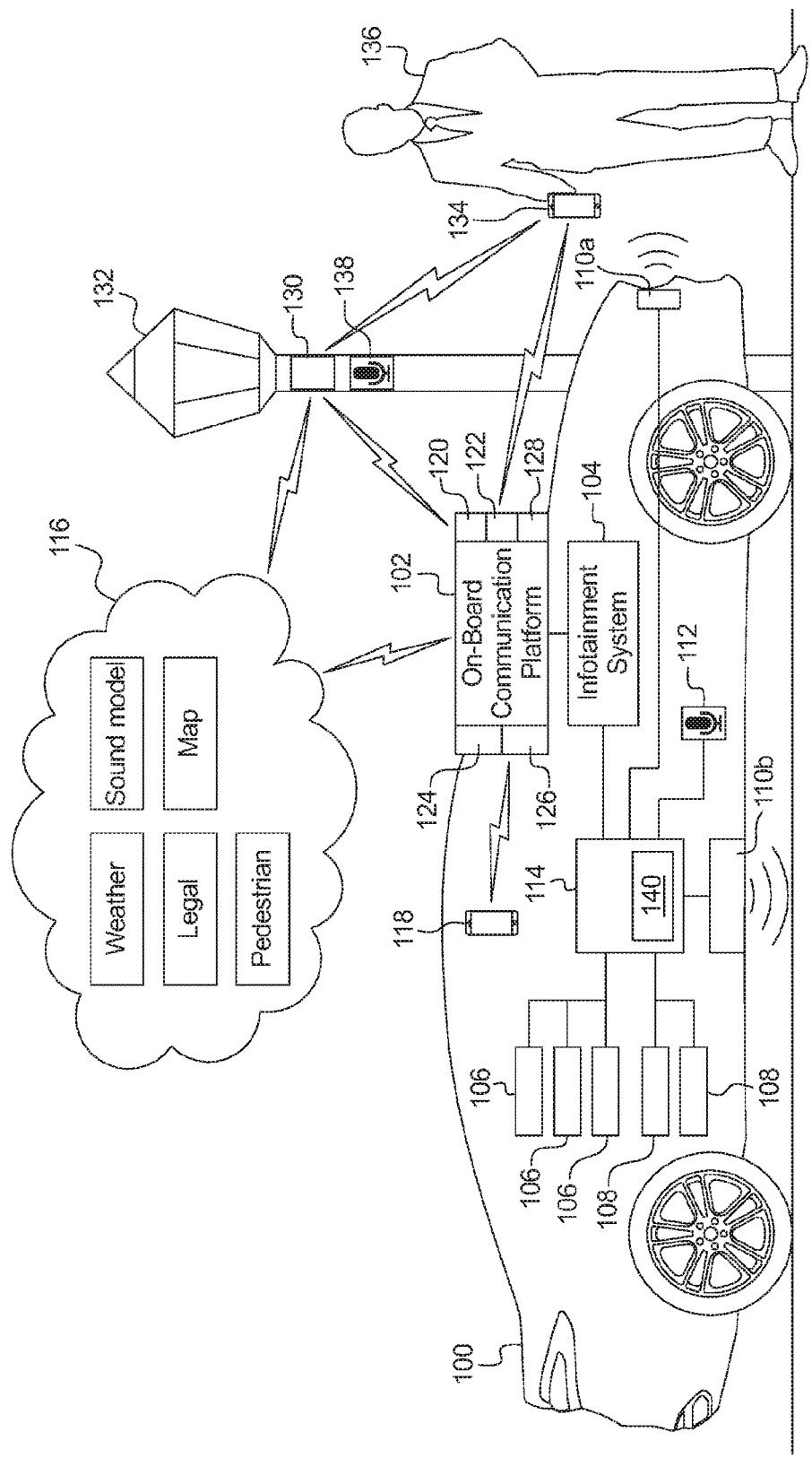
FIG. 1 is a system diagram with a vehicle operating in accordance with the teachings of this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Pedestrians use noise emitted by a vehicle to make judgments in areas where vehicles and people are in close proximity (e.g., crosswalks, parking lots, narrow streets, etc.). Often, pedestrians use noise to detect when a car is moving and judge its relative position. To pedestrians, it is difficult to judge the movement and the relative position of quiet vehicles, such as electric vehicles and noise-dampened conventional vehicles, even if the vehicle is actually moving. Additionally, various governments (e.g., city, county, perish, state, province, prefecture, country, etc.) may impose requirements for vehicles to emit a minimum amount of noise to provide acoustic information to pedestrians while additionally having noise pollution ordinances. For example, the National Highway Traffic Safety Administration is developing a standard for a minimum level of noise (see, for example, NHTSA-2011-0148 and 49 C.F.R. §571) to be emitted by road vehicles base on, in part, a standard (SAE J2889) developed by the Society of Automotive Engineers to measure a minimum level of noise emitted by a road vehicle.

As disclosed herein below, a vehicle includes a sound control unit that produces a relatively high-pitched noise at the front of the vehicle. Additionally, the sound control produces a relatively low-pitched noise under the vehicles, using the space between the vehicle and the roadway as a resonance chamber. The sound control unit is communicatively coupled to an external network to receive localized information to change the pitch and/or intensity of the produced sounds. The localized information is based on the location (e.g., coordinates provided by a global positioning system (GPS) receiver) of the vehicle. Additionally, the localized information may include weather information, sound-related legal information, map information, and/or pedestrian information. The sound control unit receives vehicle motion data from various electronic control units (ECUs) to modify the produced sounds based on the motive state of the vehicle. The sound control unit may, from time-to-time, connect to microphones in the vicinity around the vehicle to receive feedback. Based on these sources, the sound unit adjusts the sounds produced in the front and below the vehicle.

FIG. 1 is a system diagram with a vehicle 100 operating in accordance with the teachings of this disclosure. The vehicle 100 may be a noise-dampened conventional vehicle, a hybrid vehicle, an electric vehicle, or a fuel cell vehicle, etc. The vehicle 100 may be non-autonomous, semi-autonomous, or autonomous. The vehicle 100 includes parts related to mobility, such as a powertrain with an engine or an electric motor, a transmission, a suspension, a driveshaft, and/or wheels, etc. In the illustrated example, the vehicle 100 includes an on-board communications platform 102, an infotainment system 104, electronic control units 106, sensors 108, sound generators 110a and 110b, a microphone 112, and a sound control unit 114.

The on-board communications platform 102 includes wired or wireless network interfaces to enable communication with external networks 116 and/or mobile devices 118 (e.g., smart phones, smart watches, tablets, etc.). The on-board communications platform 102 also includes hardware (e.g., processors, memory, storage, antenna, etc.) and software to control the wired or wireless network interfaces. In the illustrated example, the on-board communications platform 102 includes a cellular modem 120 and/or a dedicated short range communication (DSRC) transceiver 122. Additionally, the on-board communications platform 102 includes a wireless local area network (WLAN) controller 124, an auxiliary port 126, and a GPS receiver 128. The cellular modem 120 includes controllers for standards-based networks (e.g., Global System for Mobile Communications (GSM), Universal Mobile Telecommunications System (UMTS), Long Term Evolution (LTE), Code Division Multiple Access (CDMA), WiMAX (IEEE 802.16m); and Wireless Gigabit (IEEE 802.11ad), etc.). The WLAN controller 124 includes controllers to connect to the mobile device 118 via wireless local area networks, such as a Wi-Fi® controller (including IEEE 802.11 a/b/g/n/ac/p or others), a Bluetooth® controller (based on the Bluetooth® Core Specification maintained by the Bluetooth Special Interest Group), and/or a ZigBee® controller (IEEE 802.15.4), and/or a Near Field Communication (NFC) controller, etc. The auxiliary port 126 provides hardware and software for a wired connection with the mobile device 118. The auxiliary port 126 includes one or more ports (e.g., a universal serial bus (USB) port, a Lightning® connector port, etc.) in which to plug a cable (not shown) between the mobile device 118 and the auxiliary port 126.

The example DSRC transceiver 122 includes antenna(s), radio(s) and software to broadcast messages and to establish direct connections between the vehicle 100 and DSRC nodes 130 installed on infrastructure 132 (e.g., traffic signals, traffic control boxes, lamp posts, tunnels, bridges, buildings, etc), DSRC-enabled mobile devices 134 carried by pedestrians 136, and/or DSRC transceivers of other vehicles. DSRC is a wireless communication protocol or system, mainly meant for transportation, operating in a 5.9 GHz spectrum band. More information on the DSRC network and how the network may communicate with vehicle hardware and software is available in the U.S. Department of Transportation's Core June 2011 System Requirements Specification (SyRS) report (available at http://www.its.dot.gov/meetings/pdf/CoreSystem_SE_SyRS_RevA%20(2011-06-13).pdf), which is hereby incorporated by reference in its entirety along with all of the documents referenced on pages 11 to 14 of the SyRS report. DSRC systems may be installed on vehicles and along roadsides on infrastructure. DSRC systems incorporating infrastructure information is known as a "roadside" system. DSRC may be combined with other technologies, such as Global Position System (GPS), Visual Light Communications (VLC), Cellular Communications, and short range radar, facilitating the vehicles communicating their position, speed, heading, relative position to other objects and to exchange information with other vehicles or external computer systems. DSRC systems can be integrated with other systems such as mobile phones.

Currently, the DSRC network is identified under the DSRC abbreviation or name. However, other names are sometimes used, usually related to a Connected Vehicle program or the like. Most of these systems are either pure DSRC or a variation of the IEEE 802.11 wireless standard. The term DSRC will be used throughout herein. However, besides the pure DSRC system it is also meant to cover dedicated wireless communication systems between cars and roadside infrastructure system, which are integrated with GPS and are based on an IEEE 802.11 protocol for wireless local area networks (such as, 802.11p, etc.).

The infotainment system 104 provides an interface between the mobile device 118 and/or an occupant (e.g., driver, passenger, etc.) of the vehicle 100, and the sound control unit 114. In the illustrated example, the infotainment system 104 communicatively couples to the mobile device 118 (e.g., via the auxiliary port 126, via the WLAN controller 124, etc.). The infotainment system 104 facilitates the occupant selecting (e.g., via the mobile device 118, via the infotainment head unit 202 of FIG. 2 below, etc.) a sound profile. The sound profile provides a baseline waveform (e.g., pitch, amplitude, etc.) for the sound control unit to use to generate noise external to the vehicle 100. Additionally, the sound profile may contain sounds features such as a set of harmonics and can control the attack time, decay time, sustain time, release time (ADSR) envelope. Additionally, in some examples, the sound profile also provides a waveform to be played by the internal sound system of the vehicle 100 based on the speed of the vehicle 100. For example, when a muscle car mode is selected, the sound control unit 114 produces sounds like a Ford® Mustang®. As another examples, when a forest mode is selected, the sound control unit 114 produces sounds compatible with campground surroundings.

The ECUs 106 monitor and control the subsystems of the vehicle 100. The ECUs 106 communicate properties (such as, status of the ECU 106, sensor readings, control state, error and diagnostic codes, etc.) and/or receive requests from other ECUs 106 via the vehicle data buses (e.g., the vehicle data bus 204 of FIG. 2 below). Some vehicles 100 may have seventy or more ECUs 106 located in various locations around the vehicle 100 communicatively coupled by the vehicle data buses. The ECUs 106 are discrete sets of electronics that include their own circuit(s) (such as integrated circuits, microprocessors, memory, storage, etc.) and firmware, sensors, actuators, and/or mounting hardware. The ECUs 106 include may include, for example, a transmission control, an engine/motor control, a steering control, and a brake control. The example ECUs 106 provide vehicle motion data for the sound control unit 114 to control the sound emitted by the sound generators 110a and 110b to reflect the driving condition of the vehicle (e.g., the vehicle is idling, the vehicle is slowing, the vehicle is accelerating, etc.).

The sensors 108 may be arranged in and around the vehicle 100 in any suitable fashion. The sensors 108 may include camera(s), sonar, RADAR, LiDAR, ultrasonic sensors, optical sensors, or infrared devices configured to measure properties around the exterior of the vehicle 100. Additionally, some sensors 108 may be mounted inside the passenger compartment of the vehicle 100 or in the body of the vehicle 100 (such as, the engine compartment, the wheel wells, etc.) to measure properties in the interior of the vehicle 100. For example, such sensors 108 may include accelerometers, odometers, tachometers, pitch and yaw sensors, wheel speed sensors, cameras, microphones, and thermistors, tire pressure sensors, biometric sensors, etc. The sensors 108 measure a state of the vehicle 100 (e.g., idling, accelerating, decelerating, moving, stopped, reversing, speed, etc.).

The vehicle 100 includes at least two sound generators 110a and 110b. The sound generators 110a and 110b communicatively couple to the sound control unit 114. One of the sound generators 110a is located at the front of the vehicle 100. The front sound generator 110a produces a high frequency sound (e.g., 1280 Hz to 20,480 Hz). Another one of the sound generators 110b is located under the vehicle 100 and is directed to use the space between the vehicle 100 and the roadway as a resonance chamber. The lower sound generator 110b produces a low frequency sound (e.g., 20 Hz to 1280 Hz). The microphone 112 senses the sounds produced by the lower sound generator 110b. The microphone 112 provides feedback to the sound control unit 114. As described in FIG. 3 below, the sound generators 110a and 110b produce sounds in response to signals received from the sound control unit 114.

The sound control unit 114 (sometimes referred to herein as a "sound controller") generates signals to produce sounds using the sound generators 110a and 110b. The sound control unit 114 generates a sound model based on localized data and vehicle motion data received via the infotainment system 104. In some examples, the vehicle motion data includes information from the ECUs 106 and/or the sensors 108, such as (a) the position of the transmission, (b) the revolutions per minute (RPM) of the engine or motor, (c) the steering wheel position, (d) the vehicle speed, (e) the weather (e.g., rain), (0 position of the throttle, and/or (g) the position of the brake pedal. Additionally, in some examples, the localized data includes information provided by servers on external network(s) 116, such as (a) map data, (b) traffic data, (c) pedestrian density data, (d) laws and regulations (e.g., sound ordinances, etc.), (e) time of day, and/or (f) an event calendar. In some examples, the input includes external feedback information, such as (a) microphones 138 coupled to the DSRC nodes 130 installed on infrastructure 132 and/or the DSRC-enabled mobile devices 134 carried by the pedestrians 136. The sound control unit 114 uses the inputs to modify a standard sound profile or a baseline sound profile selected by an occupant of the vehicle 100.

In some examples, the sound control unit 114 dynamically changes the sound profile based on the vehicle motion data from the ECUs 106 and/or the sensors 108. For example, the sound control unit 114 may change amplitudes of certain frequency ranges based on the revolutions per minute (RPM) of the engine or motor. As another example, the sound control unit 114 may change the amplitudes of certain frequency ranges based on a measured braking force and/or a measured acceleration. Additionally, compression of the sound can make the sound appear to be greater without increasing the size of the sounds generators 110a and 110b. In some examples, the sound control unit 114 dynamically controls the sound profile based on the location of the vehicle 100. In some such examples, the sound control unit 114 amplifies the noise produced by the sound generators 110a and 110b when the vehicle 100 is in the vicinity of a crosswalk.

The sound control unit 114 includes an adaptive filter 140 to generate signals for the sound generators 110a and 110b. The adaptive filter 140 generates the signals based on the sound profile and feedback from the microphone 112. Within the adaptive filter 140, a low-frequency filter may be linked or combined with a high-frequency filter to match the phase of the sound between the two sound ranges produced by the front sound generator 110a and the lower sound generator 110b respectively. In such a manner, overtone series are created such that the human auditory system can localize the sound using both amplitude and phase differentials. The microphone 112 senses the sound generated by the lower sound generator 110b and changed by the resonance chamber effect. The adaptive filter 140 modifies the signal to the lower sound generator 110b until the sound matches the sound profile.

Figure 2:
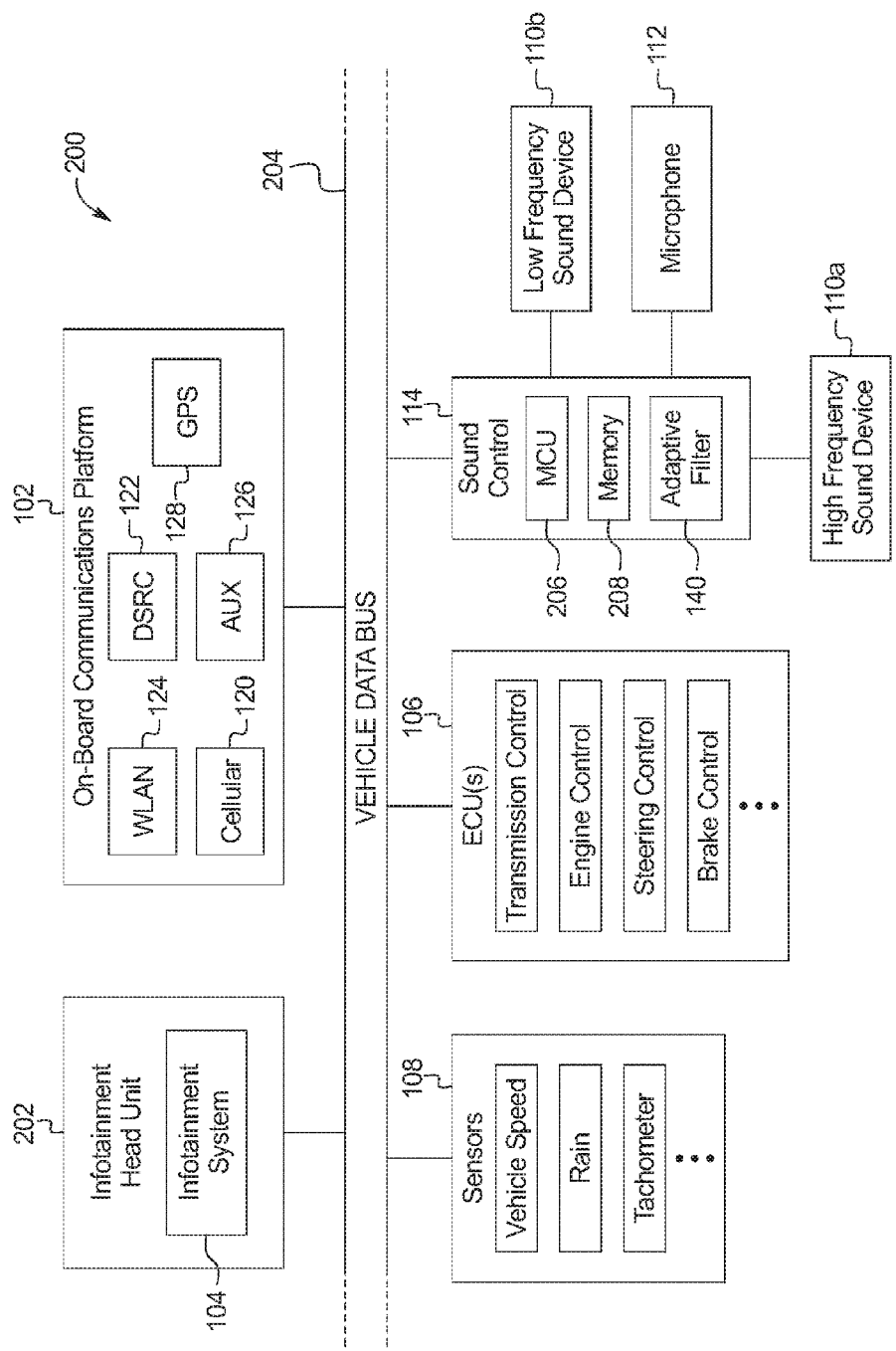
FIG. 2 is a block diagram of electrical components of the vehicle of FIG. 1.

FIG. 2 is a block diagram of electrical components 200 of the vehicle of FIG. 1. In the illustrated example, the electrical components 200 includes the onboard communication platform 102, an infotainment head unit 202, ECUs 106, the sensors 108, the sound generators 110a and 110b, the microphone 112, the sound control unit 114, and a vehicle data bus 204.

The infotainment head unit 202 provides an interface between the vehicle 100 and a user (e.g., a driver, a passenger, etc.). The infotainment head unit 202 includes digital and/or analog interfaces (e.g., input devices and output devices) to receive input from the user(s) and display information. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display ("LCD"), an organic light emitting diode ("OLED") display, a flat panel display, a solid state display, etc.), and/or speakers. In the illustrated example, the infotainment head unit 202 includes the infotainment system 104. In some examples, the infotainment head unit 202 displays the infotainment system 104 on the center console display. Additionally, the inputs of the infotainment head unit 202 control the infotainment system 104.

In the illustrated example of FIG. 2, the sound control unit 114 includes a processor or controller 206, memory 208, and the adaptive filter 140. The processor or controller 206 may be any suitable processing device or set of processing devices such as, but not limited to: a microprocessor, a microcontroller-based platform, a suitable integrated circuit, one or more application-specific integrated circuits (ASICs), or one or more field programmable gate arrays (FPGAs). The memory 208 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.), unalterable memory (e.g., EPROMs), read-only memory, and/or a high-capacity storage device (e.g., a hard drive, a solid state drive, etc.). In some examples, the memory 208 includes multiple kinds of memory, particularly volatile memory and non-volatile memory. In some examples, the memory 208 includes sound profiles that may be selected by a user.

The memory 208 is a computer readable medium on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 208, the computer readable medium, and/or within the processor 206 during execution of the instructions.

The terms "non-transitory computer-readable medium" and "computer-readable medium" should be understood to include a single medium or multiple media, such as a centralized or distributed database, and/or associated caches and servers that store one or more sets of instructions. The terms "non-transitory computer-readable medium" and "computer-readable medium" also include any tangible medium that is capable of storing, encoding or carrying a set of instructions for execution by a processor, or that cause a system to perform any one or more of the methods or operations disclosed herein. As used herein, the term "computer readable medium" is expressly defined to include any type of computer readable storage device and/or storage disk and to exclude propagating signals.

The adaptive filter 140 transforms the sound profile maintained by the sound control unit 114 into signals sent to the sound generators 110*a* and 110*b*. The adaptive filter 140 generates a signal based on the sound profile. The adaptive filter 140 receives feedback of the sound generated by the sound generators 110*a* and 110*b*. In some examples, the feedback is received from the microphone 112. Additionally, or alternatively, in some examples, the feedback is received (e.g., via the DSRC transceiver 122) from microphones of the DSRC nodes 130 attached to infrastructure 132 and/or microphones of the DSRC-enabled mobile devices 134. For example, based on the location of the vehicle 100, the sound control unit 114 may request feedback from devices (e.g., the DSRC nodes 130, the DSRC-enabled mobile devices 134, etc.) in the vicinity of the vehicle 100. The adaptive filter 140 compares the received feedback to the sound profile and corrects the signal sent to the sound generators 110*a* and 110*b*.

The vehicle data bus 204 communicatively couples the ECUs 106 and the sensors 108. In some examples, the vehicle data bus 204 includes one or more data buses. The vehicle data bus 204 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc. In some examples, the ECUs 106 and sensors 108 are organized on separate data buses to manage, for example, safety, data congestion, data management, etc. For example, the sensitive ECUs 106 (e.g., the brake control unit, the engine control unit, etc.) may be on a separate bus from the other ECUs 106 (e.g., the body control unit, the infotainment head unit 202, etc.).

Figure 3:
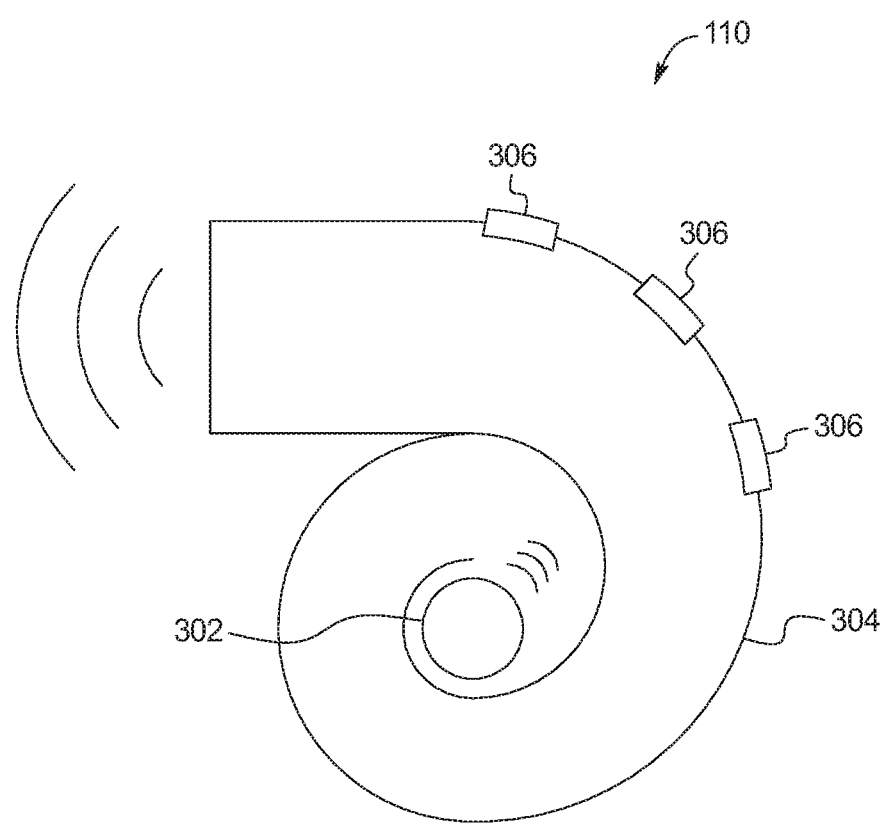
FIG. 3 illustrates an example sound generator of FIG. 1.

FIG. 3 illustrates an example sound generator 110. The front sound generator 110*a* and the lower sound generator 110*b* are examples of the sound generator 300. In the illustrated example, the sound generator 110 includes a sound transducer 302, a body 304, and one or more adjustable tone holes 306. The sound transducer 302 includes an electro-magnet and a diaphragm. Alternatively, in some examples, the sound transducer 302 includes a whistle and diaphragm, an electric motor and an impactor, or any other suitable electro-mechanical devices. In the illustrated example, the body 304 is a spiral resonance chamber. The length of the body 304 affects the tone of the sound generator 110. For example, the body 304 of the front sound generator 110*a* is relatively short, and the body of the lower sound generator 110*b* is relatively long. The adjustable tone holes 306 are controlled (e.g., by a solenoid by the sound control unit 114. The adjustable tone holes 306 open and close to adjust the pitch of the sound generator 110.

Figure 4:
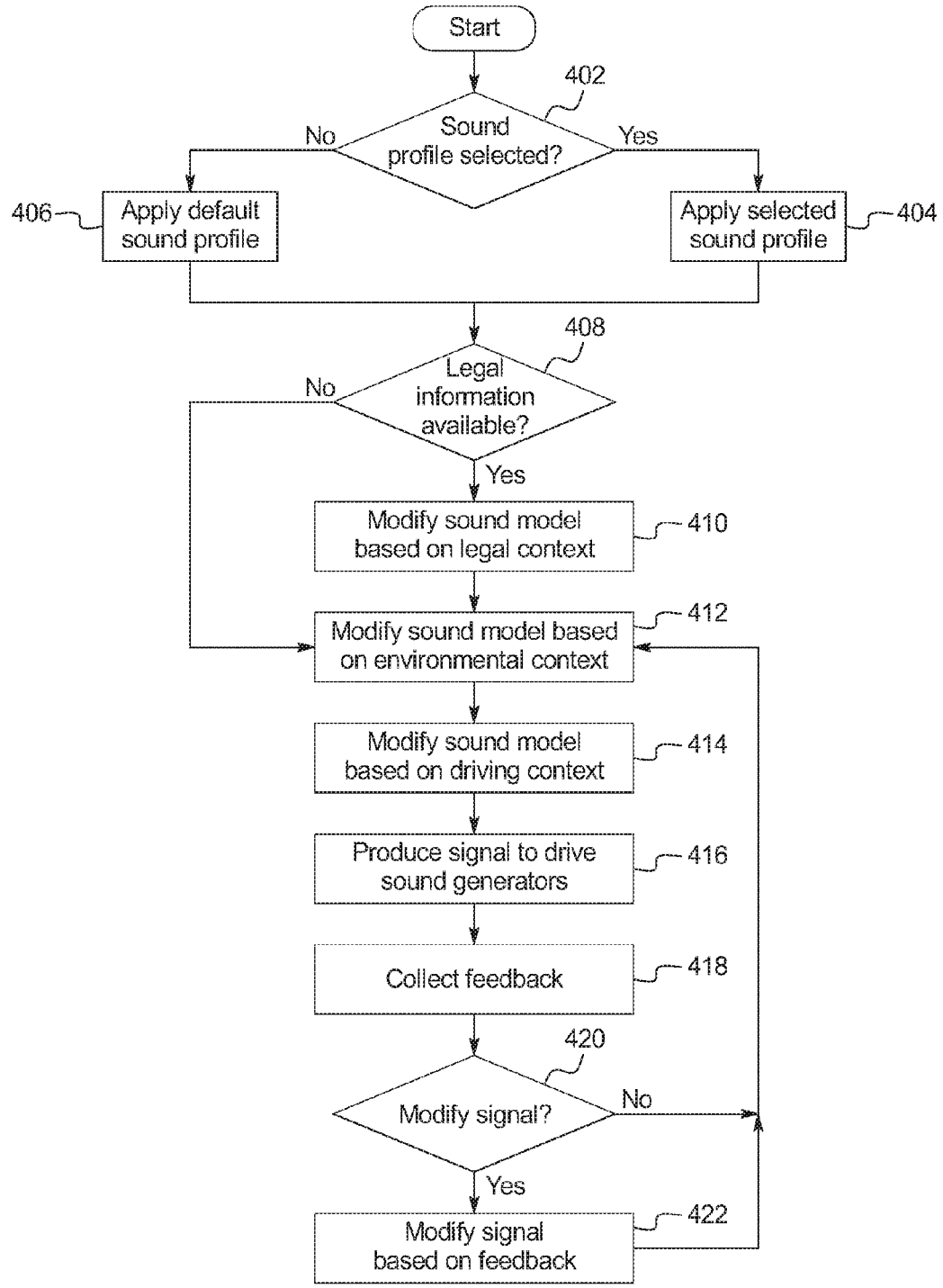
FIG. 4 is a flowchart of an example method to generate sounds to warn pedestrians.

FIG. 4 is a flowchart of an example method to generate sounds to warn pedestrians (e.g., the pedestrian 136 of FIG. 1). Initially, at block 402, the sound control unit 114 determines whether a sound profile has been selected (e.g., via the mobile device 118 communicatively coupled to the infotainment system 104, via the infotainment head unit 202, etc.). If a sound profile has been selected, at block 404, the sound control unit 114 retrieves the selected sound profile (e.g., from the memory 208). Otherwise, if one of the sound profiles has not been selected, at block 406, the sound control unit 114 retrieves the default sound profile. At block 408, the sound control unit 114 determines whether localized legal information is available for the municipality in which the vehicle 100 is located. If the localized legal information is available, the method continues at block 410. Otherwise, if the localized legal information is not available, the method continues at block 412.

At block 410, the sound control unit 114 modifies the sound profile based on the localized legal information. For example, a local ordinance may specify minimum and/or maximum amplitudes for vehicle noise. At block 412, the sound control unit 114 modifies the sound profile based on an environmental context. For example, the sound control unit 114 may modify the sound profile due to environmental noise (such as traffic noises, weather-related noises, etc.). At block 414, the sound control unit 114 modifies the sound profile based on the driving context of the vehicle 100. The driving contexts include the speed of the vehicles, the position of the brake pedal, the position of the acceleration pedal, the location of the vehicle 100 relative to a crosswalk, traffic density, and/or pedestrian density, etc. For example, the sound control unit 114 may modify the pitch of the sound generated by the sound generators 110*a* and 110*b* in response to the vehicle slowing down (e.g., high-frequency tones fade, etc.).

At block 416, the sound control unit 114, via the adaptive filter 140, generates a signal for the sound generators 110*a* and 110*b* based on the modified sound profile. At block 418, the sound control unit 114, via the microphone 112, collects feedback of the sounds produced by the sound generators 110*a* and 110*b*. In some examples, the sound control unit 114 also collects feedback from microphones 138 attached to DSRC nodes 130 attached to infrastructure 132 and/or microphone of DSRC-enabled mobile devices 134 carries by pedestrians 136 via the DSRC transceiver 122. At block 420, the sound control unit 114 determines whether to modify the signals driving the sound generators 110*a* and 110*b* based on the feedback gathered at block 418. If the sound control unit 114 determines to modify the signals driving the sound generators 110*a* and 110*b* based on the feedback, the method continues at block 422. Otherwise, if the sound control unit 114 determines not to the signals driving the sound generators 110*a* and 110*b* based on the feedback, the method returns to block 412. At block 422, the sound control unit 114 generates and applies corrective factors to the signals driving the sound generators 110*a* and 110*b* so that the sounds produced by the sound generators 110*a* and 110*b* approximates the target sound in the sound profile.

The flowchart of FIG. 4 is a method that may be implemented by machine readable instructions that comprise one or more programs that, when executed by a processor (such as the processor 206 of FIG. 2), cause the vehicle 100 to implement the sound control unit 114 of FIGS. 1 and 2. Further, although the example program(s) is/are described with reference to the flowcharts illustrated in FIG. 4, many other methods of implementing the example the sound control unit 114 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A method for a vehicle to provide acoustic information to pedestrians, the method comprising:
   producing a first sound at a first frequency range from a first sound generator located at a front of the vehicle;
   producing a second sound at a second frequency range from a second sound generator located under the vehicle;
   adjusting, by a processor, acoustic characteristics of the first and second sounds based on vehicle motion data; and
   adjusting at least one of the first sound or the second sound based on feedback collected from infrastructure nodes.

2. The method of claim 1, including adjusting the acoustic characteristics of the first and second sounds based on at least one of government regulation data, weather data, or ambient noise data.

3. The method of claim 1, including adjusting the second sound based on feedback collected from a microphone positioned under the vehicle.

4. The method of claim 1, including adjusting at least one of the first sound or the second sound based on feedback collected from mobile devices in a vicinity external to the vehicle.

5. An apparatus to a vehicle to provide acoustic information to pedestrians comprising:
   a first sound generator positioned at a front of the vehicle;
   a second sound generator positioned under the vehicle; and
   a sound controller to:
      produce a first sound from the first sound generator;
      produce a second sound from the second sound generator;
      adjust acoustic characteristics of the first and second sounds based on vehicle motion data; and
      adjust at least one of the first sound or the second sound based on feedback collected from mobile devices in a vicinity external to the vehicle.

6. The apparatus of claim 5, wherein the first sound is in a first frequency range, and the second sound is in a second frequency range, the second frequency range different from the first frequency range.

7. The apparatus of claim 5, wherein the first sound and the second sound are an overtone series.

8. The apparatus of claim 5, wherein the sound controller is to adjust the acoustic characteristics of the first and second sounds based on at least one of government regulation data, weather data, or ambient noise data.

9. The apparatus of claim 5, wherein the sound controller is to adjust the second sound based on first feedback collected from a microphone positioned under the vehicle.

10. The apparatus of claim 9, wherein the sound controller is to adjust at least one of the first sound or the second sound based on second feedback collected from infrastructure nodes.

11. A non-transitory computer readable medium comprising instructions that, when executed, cause a vehicle to:
   produce a first sound at a first frequency range from a first sound generator located at a front of the vehicle;
   produce a second sound at a second frequency range from a second sound generator located under the vehicle; and
   adjust acoustic characteristics of the first and second sounds based on vehicle motion data and feedback collected from infrastructure nodes.

* * * * *